Figure 3:
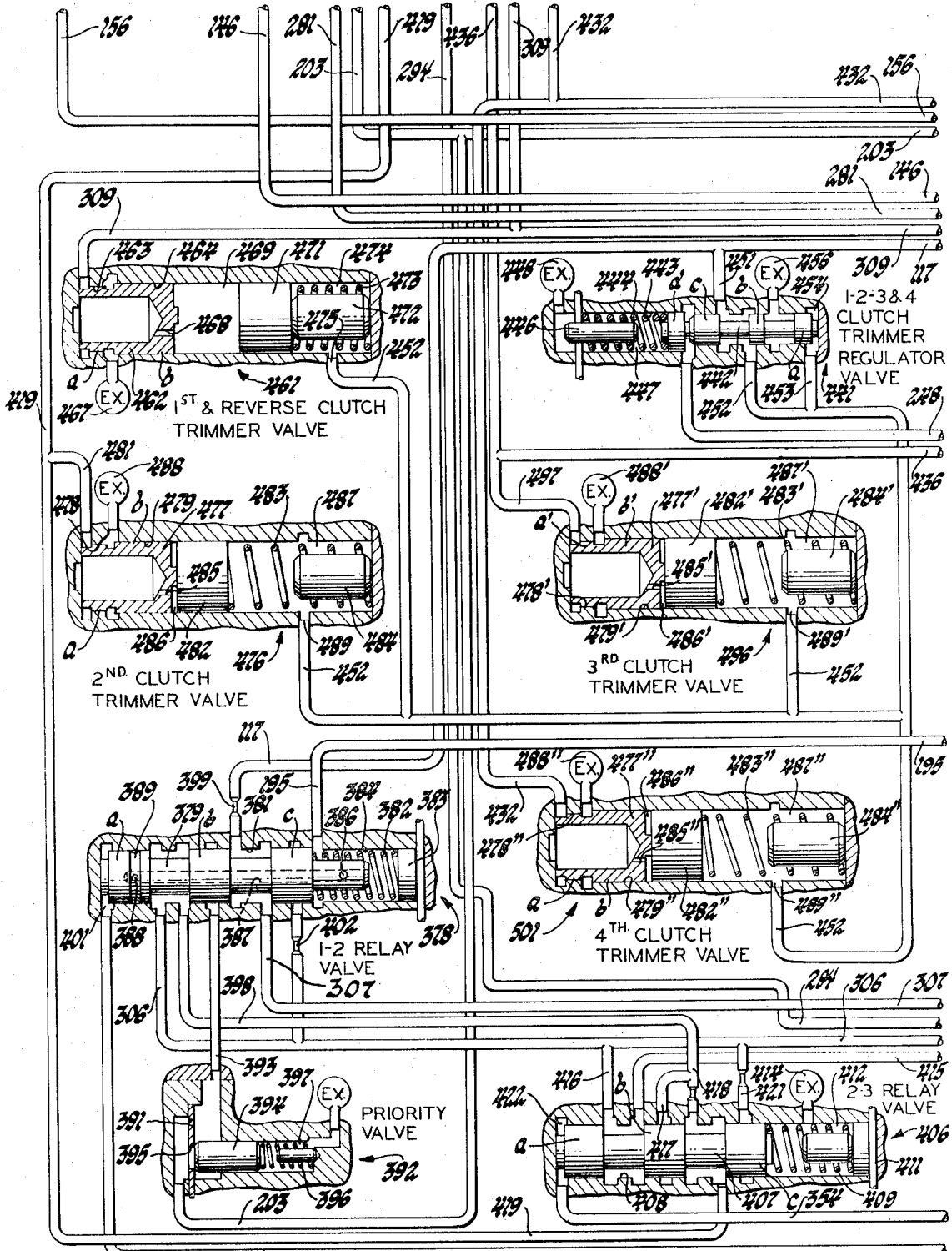

United States Patent [19]
Norris et al.

[11] 3,818,783
[45] June 25, 1974

[54] MANUAL AND AUTOMATIC SHIFT CONTROLS FOR TRANSMISSIONS

[75] Inventors: Allan S. Norris; James T. Craig, both of Indianapolis, Ind.

[73] Assignee: General Motors Corporation, Detroit, Mich.

[22] Filed: Dec. 4, 1972

[21] Appl. No.: 311,936

[52] U.S. Cl. .................. 74/869, 74/864, 74/867, 192/4 A
[51] Int. Cl. ..................... B60k 21/12, F16d 67/04
[58] Field of Search ........ 74/864, 867, 869; 92/4 A, 92/3.51

[56] References Cited
UNITED STATES PATENTS

| | | | |
|---|---|---|---|
| 3,159,051 | 12/1964 | Herndon et al. | 74/869 |
| 3,691,872 | 9/1972 | Schaefer et al. | 74/864 |
| 3,705,642 | 12/1972 | Thompson | 192/4 A |
| 3,709,064 | 1/1973 | Schaefer et al. | 74/867 X |
| 3,713,354 | 1/1973 | Edmunds | 74/869 X |

Primary Examiner—Samuel Scott
Assistant Examiner—P. S. Lall
Attorney, Agent, or Firm—A. M. Heiter

[57] ABSTRACT

In a multiratio transmission providing a low ratio drive and a plurality of higher ratio drives having a manual selector control to select the low ratio drive or automatic control of the plurality of higher automatically controlled ratio drives. On manual selection of automatic control, a plurality of automatic shift valves operate under the control of an output speed governor pressure and a torque demand pressure for automatic shifting between the low and high automatically controlled ratios in response to speed and torque demand. On manual selection of the lowest ratio drive, after the automatic control is in the lower or first automatic ratio drive, a selector valve pressure will be supplied by a low signal valve, if both the inverted modulator pressure is high, indicating less than 15% throttle advance and the governor pressure is low indicating low vehicle speed. The predetermined low throttle advance and low speed at which a manual shift to low may be made is independently controlled and adjusted by independently adjustable springs.

16 Claims, 6 Drawing Figures

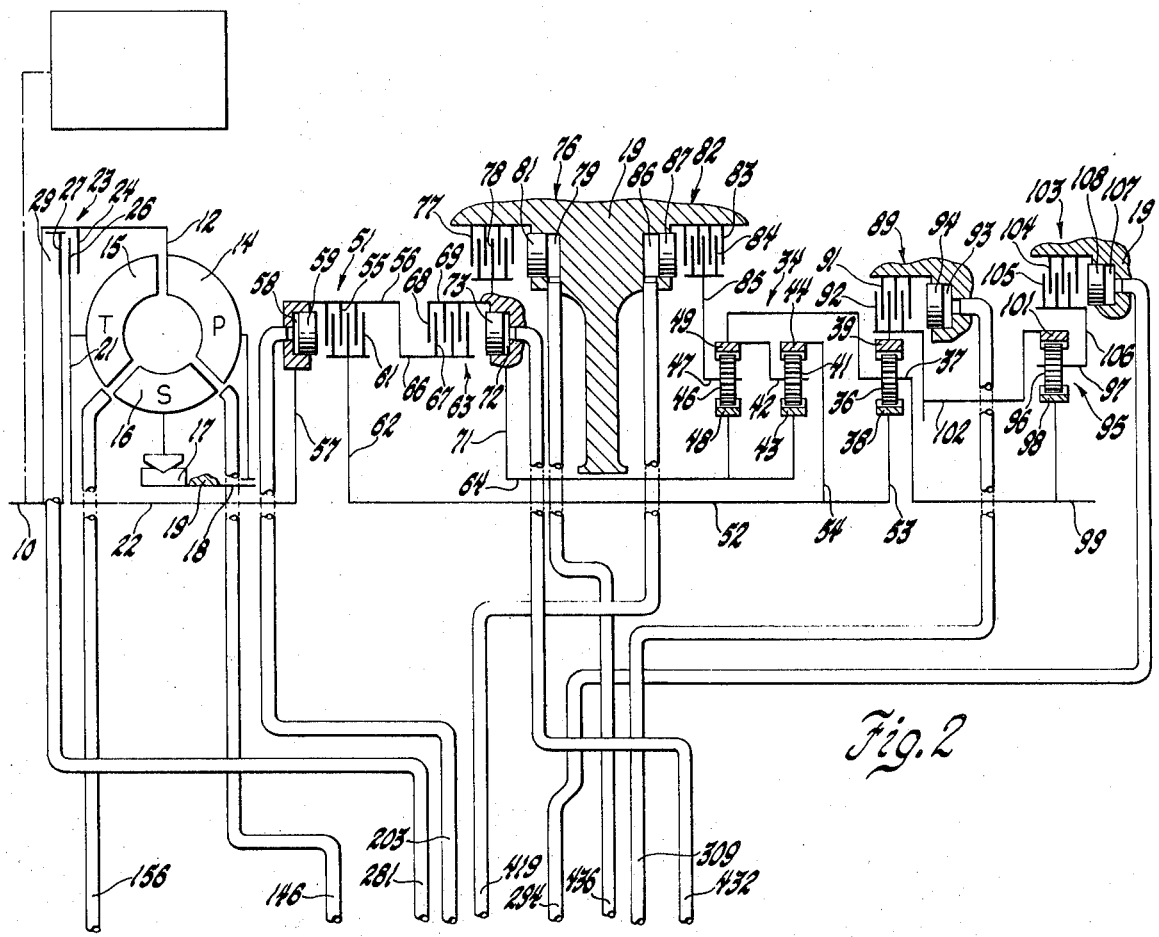

MANUAL AND AUTOMATIC SHIFT CONTROLS FOR TRANSMISSIONS

This invention relates to transmissions and controls and particularly speed and torque demand responsive automatic and semi-automatic controls.

The following patents and applications are related to this application and incorporated by reference herein.

Robert H. Schaefer et al., U.S. Pat. application Ser. No. 138,655 filed Apr. 29, 1971 U.S. Pat. No. 3,691,872.

John O. Edmunds, U.S. Pat. application Ser. No. 104,867 filed Jan. 8, 1971 U.S. Pat. No. 3,713,354.

Robert H. Shaefer U.S. Pat. No. 3,587,355 patented June 28, 1971.

This invention provides in a transmission having controls permitting a manual selection of speed and torque demand responsive automatic shifting controls in an automatic range of ratios and selection of a lower ratio drive which may become effective if the automatic shifting controls call for the first or lowest ratio drive in the automatic range and both the torque demand and output speed are in a low range.

A low one relay valve is spring biased to establish the first ratio drive in the automatic drive. The manual selector valve provides a low drive pressure signal which under proper torque demand and speed conditions is transmitted by a low one signal valve to downshift the low one relay valve to establish the lowest drive.

The low one signal valve thus functions as a shift inhibitor valve having an open position providing such first low downshift and a closed position preventing such first low downshift. The low one signal valve is spring biased to a closed position by the net effect of a heavy high force spring and a light or low force spring acting on the valve element in opposite directions. The heavy spring acts through a plug or piston on the adjacent end of the valve element to move it against the light spring at the opposite end of the valve element. In a low range of torque demand valves a torque demand force overcomes the net spring force to hold the low one signal valve in the open position. The torque demand force is provided by an inverted modulator pressure having a high pressure at low torque demand and decreasing pressure with increasing torque demand. The torque demand pressure may be modulated by compressor discharge pressure in a gas turbine engine throttle position or manifold vacuum. The inverted modulator pressure acts on an unbalanced area of the plug in a direction against the heavy spring and in a small range of low torque demand the high inverted modulator pressure overcomes the net force effect of the springs, the heavy spring force minus the light spring force, to hold the valve in the open position.

The governor pressure, which increases with increasing output speed, acts between the valve element and plug on equal areas thereof and in a low range of speeds where the low governor pressure force on the valve element is less than, or equal to, the force provided by the light spring, has no effect on the operation of the valve by inverted modulator pressure since it reduces the light spring force and provides an equal hydraulic force in the same direction on the plug. When the governor pressure force at a predetermined low speed overcomes the light spring force the valve closes independent of inverted modulator pressure. At higher torque demand values and lower inverted modulator pressure the heavy spring will close the valve independent of speed in the low speed range.

In the higher speed range, the valve would have been closed by governor pressure so the valve is closed by either torque demand or speed being above a predetermined value. The heavy spring is adjusted or changed to vary the spring force and thus the predetermined torque demand value. The light spring is adjusted or changed to vary the spring force and thus the predetermined speed value.

These and other features of the invention will be apparent from the following description and drawing of the invention.

FIGS. 2, 3, 4, 5 and 6 when arranged according to FIG. 1 schematically show the gearing and control of the transmission.

Referring to the drawing, FIG. 2 shows the power train having an engine 9 driving an input shaft 10 driving a rotary torque converter housing 12 which drives the pump 14. The pump hydrokinetically drives the turbine 15 and the fluid is redirected by the stator 16 to the pump 14. The stator is mounted on a one-way brake 17 secured to a sleeve 18 fixed to the housing 19. The turbine is connected by a hub 21 to the torque converter output shaft 22. A lockup clutch 23 for directly connecting the input shaft 10 to the converter output shaft 22 has a fixed backing plate 24 mounted on the rotary housing 12, a driven plate 26 connected through hub 21 to drive the output shaft 22 and a diaphragm piston and apply plate 27 which forms a closed expansible chamber 29 between the diaphragm piston 27 and the front wall of the rotary housing 12.

The four speed gear unit 34 has three planetary gear sets and is compounded with a low speed gear set 95 to provide 5 speeds which are hereinafter referred to as low and first to fourth. In the four speed unit 34, the rear or first gear set has planetary pinions 36 mounted on a carrier 37 and meshing with sun gear 38 and ring gear 39. The second gear set has pinions 41 rotatably mounted on carrier 42 and meshing with sun gear 43 and ring gear 44 and the third gear set has planetary pinions 46 mounted on the carrier 47 and meshing with sun gear 48 and ring gear 49.

The forward clutch 51 is engaged in all forward ratios and connects the converter output shaft 22 to drive the range gear unit input shaft 52 which drives, through hub 53, the sun gear 38 of the first gear set and through hub 54 the ring gear 44 of the second gear set. The forward clutch 51 has input plates 55 mounted on a drum 56 driven by the rotary hub 57 drive connected to shaft 22. The hub 57 has a cylinder 58 formed therein for piston 59. On the supply of fluid by drive four line 203 to the cylinder 58, the piston 59 engages the input plates 55 and the output plates 61 which are connected by a hub 62 to drive the gear unit input shaft 52. Fourth speed clutch 63 connects the converter output shaft 22 to the secondary input shaft 64 which drives the sun gears 43 and 48 of the second and third gear sets and with the above forward clutch drive locks the gearing for 1:1 drive from carrier 42, ring gear 49 and carrier 37 to the output shaft 99. The fourth speed clutch 63 has an input drum 66 formed as a continuation of drum 56 and is thus driven by shaft 22 and drives input plates 67. The output plates 68 are connected by drun 69 and hub 71 to secondary input shaft 64. The hub 71 has a cylinder 72 formed therein for the piston 73. On the supply of fluid to the cylinder by fourth clutch apply line 432, piston 73 engages the plates to effect a drive from the converter output shaft 22 to the secondary input shaft to drive sun gears 43 and 48. The shaft 64 may also be held by the third speed brake 76 which has fixed plates 77 and rotary plates 78 drive connected through drum 69 and hub 71 to shaft 64 to hold shaft 64 and sun gears 43 and 48. When fluid is supplied by third apply line 436 to the cylinder 79 formed in housing 19 to move the piston 81 to engage plates 77 and 78, the brake 76 is engaged to hold the shaft 64 and the sun gears 43 and 48. The second speed brake 82 has a plurality of fixed plates 83 fixed to the housing 19 and rotary plates 84 connected by hub 85 to the carrier 47 of the third gear set. When fluid is supplied by second apply line 419 to the cylinder 86 formed in housing 19, piston 87 moves to engage the plates 83, 84 and holds the carrier 47. The first and reverse brake 89 has a plurality of fixed plates 91 secured to housing 19 and rotary plates 92 drive connected to ring gear 39. When fluid is supplied, by first speed brake apply line 309 to the cylinder 93 formed in housing 19 to move the piston 94 and engage plates 91, 92, the ring gear 39 of the first gear set is held.

A low gear set 95 has a plurality of planetary pinions 96 mounted on a carrier 97 and meshing with a sun gear 98 which is drive connected to the output shaft 99 and with the ring gear 101 which is drive connected by a hub structure 102 to the ring gear 39 of the first gear set. The low brake 103 has a plurality of fixed plates 104 secured to the housing 19 and rotary plates 105 secured by drum and hub 106 to the carrier 97. Fluid is supplied by low brake apply line 294 to cylinder 107 in housing 19 to move piston 108 to engage plates 104 and 105 to establish low speed drive.

CONTROLS

The brakes and clutches are engaged as indicated by X on the following chart and the others disengaged to provide neutral, five forward speeds and reverse.

| Drives | Brakes | | | | Clutches | |
|---|---|---|---|---|---|---|
| | 103 | 89 | 82 | 76 | 63 | 51 |
| R | | X | | | X | |
| N | | X | | | | |
| Lo | X | | | | | X |
| 1 | | X | | | | X |
| 2 | | | X | | | X |
| 3 | | | | X | | X |
| 4 | | | | | X | X |

FLUID SUPPLY

Figure 6:
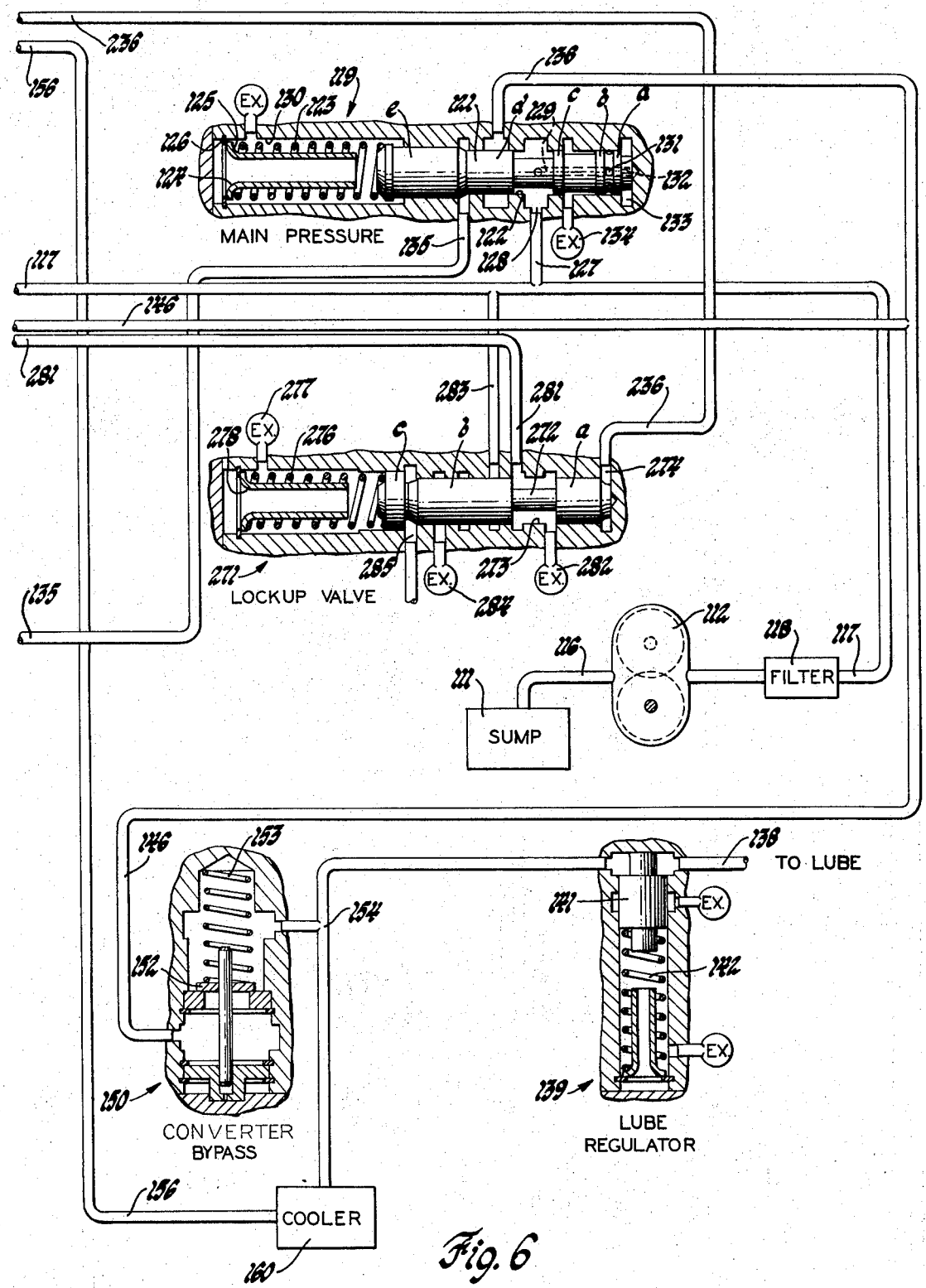

Referring to FIG. 6, the fluid exhausted from the control and lubrication system collects in the sump 111 in the lower portion of the transmission housing. A gear pump 112 draws fluid through the suction line 116 and delivers fluid through filter 118 to the main line 117 and is regulated by the main pressure regulator valve 119. The main pressure regulator valve 119 has a valve element 121 having lands $a$, $b$, $c$, $d$ of equal diameter and a large land $e$ located in a stepped bore 122. The valve element 121 is biased to the closed position shown by a spring 123 mounted on a spring seat and stop element 124 which is a tubular member to limit valve movement and spring compression having a flared end 125 providing a seat for the spring and abutting snap ring 126 to retain the seat element and spring in spring chamber 130 vented to exhaust. The main line 117 has a branch 127 connected between the lands $c$ and $d$ and through port 128 and the bore 129 through the valve to the port 131 between the lands $a$ and $b$ and through a restriction to the port 132 at the end of the valve element to provide hydraulic bias in chamber 133 opposing the spring to regulate the main line pressure at a predetermined value. Regulated pressure is supplied by port 131 to the space between the lands $a$ and $b$ to prevent leakage from chamber 133 to the space between lands $b$ and $c$ vented by exhaust 134. The forward knockdown pressure line 135 is connected at the step between lands $d$ and $e$ to reduce the regulated pressure to, i.e., 150 psi in all forward drive positions while pressure in reverse drive is higher, i.e., 250 psi. Excess main line pressure in line 117 and chamber 133 moves the regulator valve element 121 to the exhaust position exhausting branch 127 to overage line 136 which feeds the converter through a converter feed line 146. The cooler outlet line 154 is connected to the lubrication lube regulator valve 139 which has a valve element 141 biased to a closed position by a spring 142 and is closed when the overage pressure does not exceed a low value to first supply lubrication line 138. When the lubrication pressure is sufficient, overage pressure exceeds a predetermined value, i.e., 40 psi and the valve 139 opens to connect cooler outlet line 154 to exhaust. When converter feed pressure exceeds a predetermined low pressure, excess fluid in converter feed line 146 moves valve element 152 against the bias spring 153 of coupling bypass valve 150 and lube pressure to exhaust excess converter feed pressure to the cooler outlet line 154. The converter outlet line 156 is connected in FIG. 6 through the cooler 160 to the cooler outlet line 154 where the pressure is limited by the lube regulator valve 139.

DETENT VALVE

Figure 5:
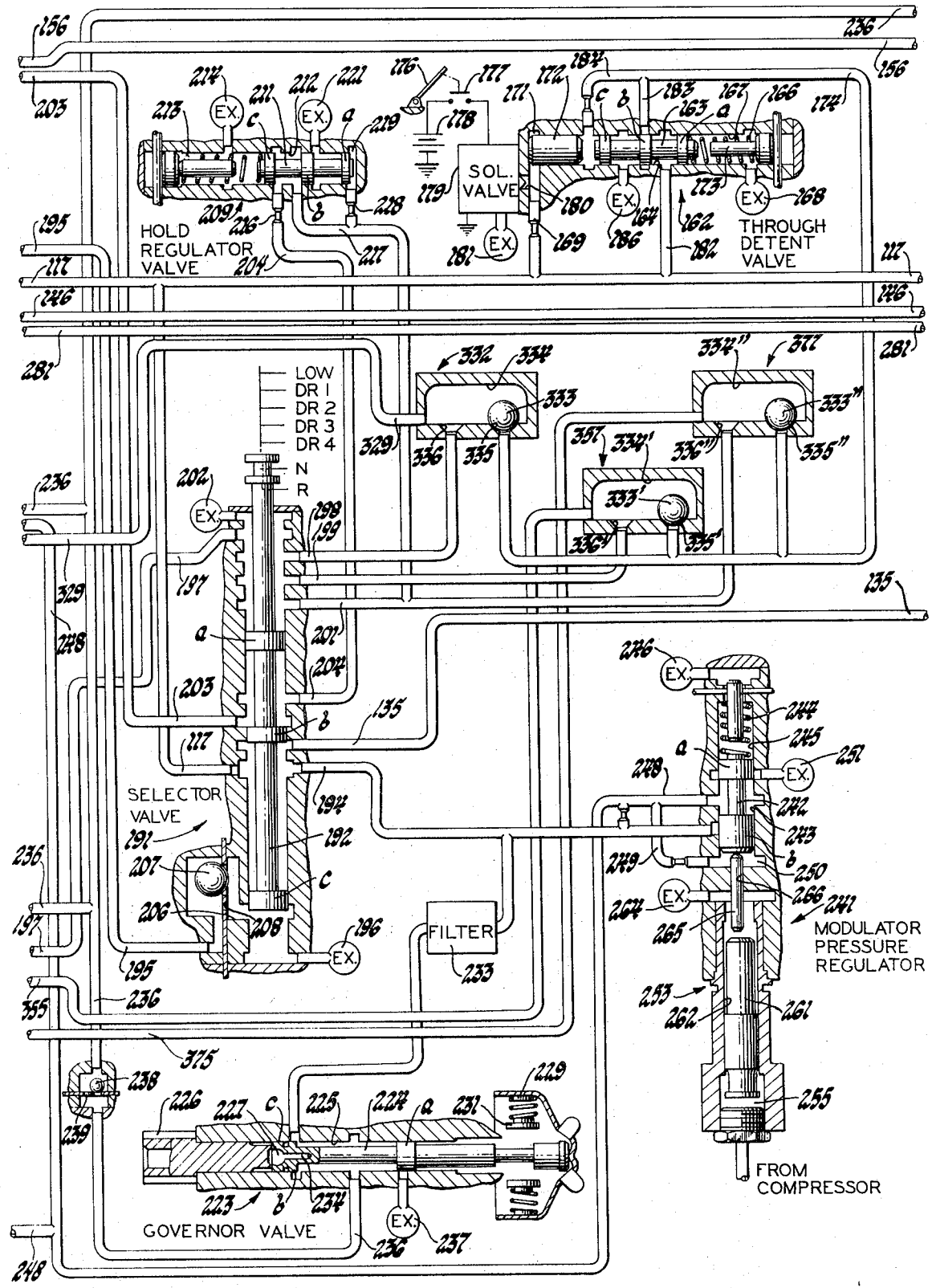

A through detent valve 162, FIG. 5, which has a valve element 163 having equal diameter lands $a$, $b$ and $c$ located in a bore 164 and is biased in an opening direction by a spring 166 seated on a seat and located in the spring chamber 167 vented by exhaust 168. Main line pressure 117 is connected through restricted passage 169 to a chamber 171 to act on the inactivating piston 172 to normally engage valve element 163 and hold it in the extreme right position against the stop element 173 so that the through detent valve does not deliver pressure to the detent line 174. When the throttle pedal 176 is past the full throttle position, it closes switch 177 connecting a grounded power source 178 to the solenoid valve 179 which opens the port 180 to exhaust 181 to vent fluid in chamber 171 to permit the detent valve 162 to regulate pressure. The regulated pressure supplied from main line 117 via branch 182 to the space between lands $a$ and $b$ to the branch 183 of detent line 174 and through restricted branch 184 to the space between the piston 172 and valve element 163 to initiate regulation of detent line pressure at a predetermined low value, i.e., 38 psi, determined by spring 166. Excess pressure will move the valve element 163 against the spring 166 and connect the detent line to exhaust 186.

SELECTOR VALVE

The manual selector valve 191 has a valve element 192 having equal diameter lands $a$, $b$ and $c$. In all valve positions, main line 117 is connected to the signal feed line 194. In neutral the main line is also connected to the forward knockdown line 135. The reverse selector line 195 is connected by restriction 208 to exhaust 196. The low feed line 197, drive one line 198, drive two line 199 and the drive three line 201 are connected to exhaust 202. The drive four line 203 is connected via hold feed line 204, hold regulator valve 209, hold pressure line 217, drive three line 201 to exhaust 202.

On movement of the selector valve 192 to the reverse position, land c closes exhaust 196 and opens port 206 to connect main line by fast feed ball check valve 207 and slow return restriction 208 to the reverse selector line 195. The forward knockdown line 135 is also exhausted via hold feed line 204. On movement of the selector valve to drive four position, DR4, reverse is exhausted and in addition to feeding feed line 194 and forward knockdown line 135 as in nuetral, the drive four line 203 is fed while the other drive lines remain connected to exhaust as in neutral. In drive three position, DR3, the main line 117 additionally feeds the hold feed line 204 and blocks the exhaust of drive three feed line 201. In drive two position, DR2, the main line feeds the same lines and interconnects drive two feed line 199 and drive three feed line 201. In drive one position, DR1, the main line feeds the same lines and the drive one feed line 198, drive two feed line 199 and drive three feed line 201 are interconnected and feed. Similarly, in low position these lines and the low feed line 187 are interconnected and feed.

HOLD REGULATOR VALVE

The hold regulator valve 209 regulates the pressure distributed by the drive one, two and three feed lines and has a valve element 211 having equal lands $a$, $b$ and $c$ located in a bore 212. A spring 213 seated in a spring chamber vented by exhaust 214 biases the valve 211 to the open position shown in which the hold feed line 204 is connected through restriction 216 to the space between lands $b$ and $c$ and supplies hold pressure supply line 217 which is connected to the drive three line 201. Hold pressure supply line 217 is also connected by restricted passage 218 to the closed chamber 219 at the end of bore 212 to act on land $a$ of the valve element to oppose the spring bias. The pressure in chamber 219 moves the valve against the spring to connect line 217 to exhaust 221 or feed line 204 to regulate hold pressure at a valve intermediate main line pressure and detent pressure, i.e., 45 psi.

GOVERNOR

The governor valve 223 has a valve element 224 having equal lands $a$, $b$ and $c$ mounted in a bore 225 and is rotatably driven by a gear 226 driven from output shaft 99 by a spline connector 227 which permits axial movement of the valve element 224 under the influence of the rotating governor weights 229 and secondary weights 231 which provide a stepped pressure varying with output or vehicle speed. Fluid pressure supplied by the signal feed line 194 through filter 233 is connected between lands $a$ and $b$ and by a passage 234 through the valve element to the end valve element 224 to act on the end of the valve element to move it to an exhausting position connecting governor signal line 236 to exhaust 237 against the opposing force of the governor weight. The force of the governor weight overcomes the pressure to move the valve to the left connecting signal feed line 194 to governor line 236 and closing exhaust 237. The one way check valve 238 permits fast flow of the governor signal pressure to the shift valves and the return restriction 239 only permits slow return flow so the governor pressure line has fluid flow to supply without pressure drop, the expanding governor pressure chambers when shift valves upshift and reduce return flow to prevent sharp reduction of governor pressure due to drive line shock.

MODULATOR PRESSURE REGULATOR

The modulator pressure regulator 241, FIG. 5, provides a pressure inversely proportional to torque demand and has a valve element 242 having equal lands $a$ and $b$ mounted in a bore 243. The spring 244 in spring chamber 245 vented by exhaust 246 biases the valve element to the open position connecting signal feed line 194 between the lands to the modulated signal line 248 which is connected by a restrictive passage 249 to the chamber 250 at the end of the bore 243 to act on the end of land $b$ to bias the valve element to connect modulator line 248 between lands $a$ and $b$ to exhaust 251, to regulate the modulated signal pressure inversely proportional to engine load or the force delivered by compressor discharge actuator 253.

The modulator pressure regulator valve 241 is controlled by an actuator 253 consisting of an actuator stem 261 which is reciprocally mounted in a bore 262 in the end wall of the valve body which is vented by exhaust 264. A chamber 255 at the end of stem 261 is connected to the compressor of the gas turbine to permit compressor discharging pressure, which is proportional to engine power developed and torque demand, to act on the stem 261. The stem 261 engages a pin 265 reciprocally mounted in a bore 266 in the valve body to engage the valve element 242. The force of the actuator stem 261 is proportional to the compressor discharge pressure and thus increases with increasing compressor discharge pressure and acts through the stem 261 and pin 265 on the valve element 242 and with the regulated pressure in opposition to the valve spring 244 to provide a regulated pressure inversely proportional to actuator force, or compressor discharge pressure.

LOCKUP VALVE

The lockup shift valve 271, FIG. 6, has a valve element 272 having lands $a$, $b$ and $c$ reciprocally mounted in a stepped bore 273. The governor pressure line 236 is connected to closed chamber 274 to act on the end of land $a$ to bias the valve against the bias of spring 276 located in a chamber vented by exhaust 277 and having a stop and spring seat member 278. Governor pressure from a front pitot governor (not shown) as shown in the above U.S. Pat. application Ser. No. 138,655 may be used for only the lockup valve. Port 285 between lands $b$ and $c$ is exhausted. In some transmission designs, it is desirable to have the lockup valve shifted in drive one. In these transmissions the drive one line 198 is connected with the port 285 so that line pressure will upshift the lockup valve. With the lockup valve in a downshift position shown, lockup apply line 281 is connected to exhaust 282 to disengage the lockup clutch 23. This valve is upshifted by governor pressure in an upshifted direction and overcoming the bias of the spring in a downshift direction. The lockup valve provides the shifts at a fixed output speed. In the upshifted position main pressure in lockup feed line 283 is connected between the lands *a* and *b* of the upshifted lockup valve to lockup clutch apply line 281 to engage the lockup clutch. The land *b* is slightly larger than land *a* so the main line pressure connected to the lockup clutch provides a hysteresis force, so downshifts are at lower speeds. The exhaust 282 then being closed. The exhaust 284 permits leakage fluid to escape to prevent main line leakage affecting modulator pressure.

LOW-ONE SHIFT SIGNAL VALVE

Figure 4:
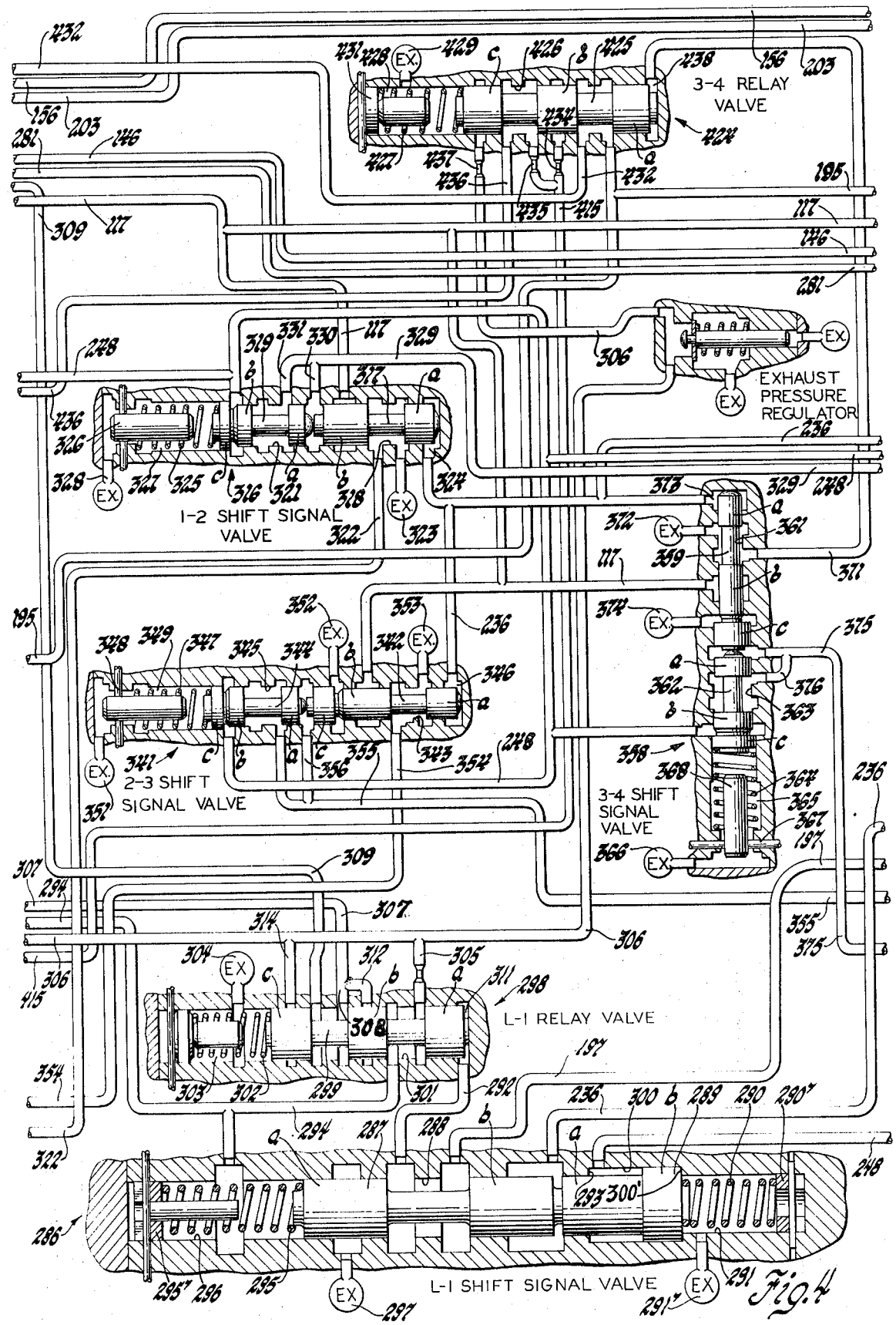

The low-one shift signal valve 286, FIG. 4, controls the low to first shift by controlling the low-one shift relay valve 298 to control the engagement of the low brake 103. The shift signal valve 286 has a valve element 287 having equal diameter lands *a* and *b* slidably mounted in a bore 288 and a plug 289 having small land in *a* bore 288 and large land *b* slidably mounted in a larger stepped portion 300 of bore 288.

The valve element 287 is spring biased, in the absence of pressure biasing, to closed position by heavier force torque demand control spring 290 seated on the adjustable spring seat 290' at the end of bore 288 in spring chamber portion 291 vented by exhaust 291' to overcome lighter force spring 295 and hold large land *b* of plug 289 against shoulder 293 at the step between the large and small portions of the stepped bore. The lighter force governor control spring 295 is seated on the adjustable spring seat 295' at the opposite end of bore 288 and located in chamber 296 connected to low brake apply line 294. The adjustable spring seats 290' and 295' are constructed as shown and described in the above U.S. Pat. No. 3,587,355, FIGS. 2 and 2*a*. When the valve 286 is in the closed or inhibiting position, the low feed line 197 from the selector valve is blocked by land *b* and low one shift signal line 292 is connected between the lands to exhaust 297 so the low first relay valve 298 is in first position. When the selector valve is in low position supplying low feed line 197 and under proper low speed and throttle or torque demand conditions the low first signal valve 286 will move to the open or shifting position shown supplying low first signal line 292 to downshift low one relay valve 298 to permit a first to low shift. The inverted throttle modulator pressure line 248 is connected to the bore 288 at step 293 to act on the differential area between lands *a* and *b* of plug 289 to urge the plug against spring 290. Thus the modulator pressure, differential area and both springs determine the low torque demand range in which the high torque demand pressure will overcome the net force of the springs, spring 290 less spring 295, thus placing plug 289 against stop shoulder 300' between bore portions 300 and 291 and valve element 287 in open position permitting a first to low shift. The spring 290 may be changed or adjusted by using the adjustable spring seat 290' of the above U.S. Pat. No. 3,587,355 to vary the spring force to change only this torque demand range. The governor pressure line 236 is connected to bore 288 between valve element 287 and plug to act on the end of land *b* of valve element 287 to move the valve element 287 at a low speed against only spring 295 to the closed position abutting the stop of adjustable seat 295' to prevent first to low shifts and thus determine a range of low speed values in which a first to low shift is permitted. This speed range may be similarly changed by changing the spring 295 or adjusting its seat 295' to change the spring force.

Note that governor line 236 has a port at bore 288 slightly wider than the movement of plug 289 so governor pressure is always connected between the valve element and plug in all positions. Since the governor pressure acts in opposite directions on the valve element against governor spring 295 and on the plug against torque demand spring 290, governor pressure does not in the low range, before it overcomes the light spring 295, change the net spring effect or modify torque demand control of the valve. Thus the low first signal relay valve 286 will only permit a first to low shift at less than a predetermining throttle or torque demand valve, i.e., 15 percent or at less than a low predetermined speed value, i.e., 8 mph and increase of either torque demand or speed independent of the other above these values will inhibit such a shift. Variations of torque demand and speed below its respective predetermined value does not change these predetermined values. Either torque demand or speed above the respective predetermined values independently closes the valve independent of the value of the other. The predetermined torque demand and speed values may be independently adjusted by adjusting respectively torque demand spring seat 290' and speed spring seat 295'. When a shift to low is made, low apply line 294 supplies fluid to chamber 296 to hold the low one signal valve in the open position to maintain low drive regardless of torque demand and speed.

LOW-ONE RELAY VALVE

The low-one relay valve 298, FIG. 4, has a valve element 299 having equal diameter lands *a*, *b* and *c* mounted in a bore 301 and biased to the first drive speed position by the spring 302 mounted in a spring chamber 303 vented by exhaust 304. With the valve element in the first drive speed position shown, the first apply line 309 is connected to branch 308 of line 307. Main line pressure is supplied from the one-two relay valve 378 via line 307 and its branch 308 between the lands *b* and *c* to the first speed apply line 309 which is connected to the first brake cylinder 93 to establish first speed drive. Low apply line 294 is connected via restricted branch 305 to exhaust line 306 to disestablish low drive. When fluid is supplied by the low-one shift signal valve 286 to the low-one shift signal line 292 to the chamber 311 at the end of valve element 299 acting on land *a*, the valve is moved against the spring bias to the low position connecting the first apply line 309 to branch 314 of exhaust line 306 to disestablish first, land *b* blocks branch 308 of line 307 and low first feed line 307 via branch 312 is connected to low apply line 294 to establish low drive.

ONE-TWO SHIFT SIGNAL VALVE

Automatic shifting between first to fourth speed forward drives is provided by a speed and engine load signal controlled shift signal valve, one for each speed change, each having an associated relay valve. The shift and relay valves for each speed change are similar but are individually described with regard to the connections and operation.

The one-two shift signal valve 316, FIG. 4, has a valve element 317 having land *a* and larger land *b* in a stepped bore 318 and a control element 319 having lands *a*, *b* and *c* of increasing diameter from *a* to *c* mounted in a stepped bore 321. The land *b* of valve element 317 is larger than land *a* so that when the valve is moved from the downshift position shown in FIG. 4 to the upshift position connecting main line 117 to the one-two signal line 322 for a shift to second speed, there is an added hysteresis force in an upshift direction on the valve. In the downshift position shown, the one-two signal line 322 is connected to exhaust 323 and this hysteresis force is dropped. In both downshift and upshift positions, governor pressure from line 236 enters chamber 324 at the end of bore 318 and acts on land *a* of valve element 317 in an upshift direction. Also modulator pressure line 248 is connected to the stepped bore between the large land *c* and the smaller land *b* of control element 319 to also provide an upshift direction force. Both the governor and modulator upshift direction forces are opposed by the downshift direction force of spring 325 which is mounted on a suitable spring seat and stop assembly 326 in a spring chamber 327 vented by exhaust 328. When governor pressure and modulator forces overcome the spring force, both valve elements upshift and the modulator pressure from line 248 is also connected between land *a* and land *b* of the control valve element 319. Since land *b* is larger than the land *a* there is an additional area and upshift force after upshifting to control the downshift. The two-one downshift line 329 may supply either hold pressure from the drive one line 198 or detent pressure from detent line 174 and is connected via branch 330 to hold the shift valve element 317 in the downshift position when downshifted or via branch 331 when the valve element is upshifted to downshift the shift valve element at a predetermined speed. The regulated hold pressure supplied is insufficient to downshift above a predetermined speed for a proper shift.

The two-one downshift line 329 is supplied in a detent position of the throttle pedal by detent valve 162 and detent line 174. If the slightly higher hold pressure from hold regulator valve 209 is connected by the selector valve 191 in the drive one position to drive one line 198, the one-two shuttle valve 332 blocks detent line 174 and connects hold pressure from drive one line 198 to downshift line 329. The shuttle valve 332 has a ball 333 located in a chamber 334 having a bottom surface having depressed seat port 335 at the entry of detent line 174 to the chamber and closely adjacent depressed seat port 336 at the entry of drive one line 198. The downshift line 329 is connected to chamber 334 by a port that is wide and positioned so it cannot be blocked by ball 333. When pressure is supplied to one of seat ports 335 or 336, the ball will seat in and close the other. The chamber has a rounded upper surface particularly at the ends to guide the ball into the seat ports and the height of the chamber between the seat ports should be only slightly greater than the ball diameter.

TWO-THREE SHIFT SIGNAL VALVE

The two-three shift signal valve 341 has a valve element 342 having lands *a*, *b* and *c* of increasing diameter from *a* to *c* in a stepped bore 343 and a control element 344 having lands *a*, *b* and *c* of increasing diameter from *a* to *c* in a stepped bore 345. In both the up and down shift positions of the shift valve, the governor pressure line 236 is connected to the chamber 346 to provide an upshift direction force and the modulator pressure line 248 is connected between the lands *b* and *c* of control element 344 to act on the excess area of land *c* to provide an upshift force against the downshift direction force of spring 347 mounted on a seat assembly 348 in the spring chamber 349 which is vented by exhaust 351. Exhaust 352 vents a space between lands *b* and *c* of valve element 342. Exhaust 353 exhausts the two-three signal line 354 with the valve element 342 in the downshift position shown so there is no two-three signal pressure for a shift to third. On an upshift exhaust 353 is closed and main line 117 is connected to the two-three signal line 354. With the shift valve 342 and control valve 344 in the downshift position shown or upshift position, governor pressure from line 236 in chamber 346 acting on land *a* and modulator pressure from line 248 acting on land *c* of control valve 344 provides an upshift direction force against the downshift force of spring 347 to provide upshifts. When the governor pressure and modulator pressure overcomes the spring force, the shift valve 342 and control valve 344 move to the upshift position. The main line pressure acting on land *b* provides an upshift hysteresis force and modulator pressure acting on land *b* provides an added upshift force to provide downshifts at speeds lower than upshift speeds. The three-two downshift line 355 in the downshift position of the shift valve and the branch 356 in upshift position of the shift valve is connected to the valve bore between the shift valve element 342 and the control valve element 344, for downshifting the shift valve element when supplied with hold or detent pressure. The detent pressure line 174 and the hold pressure via drive two line 199 are connected to the two-three shift shuttle valve 357 which has the same structure as the one-two shuttle valve 332 and thus has the same reference numbers primed. When the throttle pedal is in detent position providing detent pressure in line 174 shuttle valve 357 connects this pressure to the three-two downshift line 355 but if the selector valve 191 is in drive three or two positions providing hold pressure in line 199 this pressure is supplied to downshift line 355 and detent pressure blocked.

THREE-FOUR SHIFT SIGNAL VALVE

The three-four shift signal valve 358, FIG. 4, has a shift valve element 359 having lands *a*, *b* and *c* located in a stepped bore 361 and a control valve element 362 having lands *a*, *b* and *c* in a stepped bore 363. The lands of both valve elements have sequentially increasing diameters from *a* to *c*. Both valve elements are biased to the downshift position by a spring 364 located in a spring chamber 365 vented by exhaust 366. The spring is seated on an adjustable seat 367 and having a stop pin 368 limiting valve movement. In the downshift position, shift valve element 359 blocks main line 117 and connects the three-four shift signal line 371 to exhaust 372. In this position governor pressure acting in chamber 373 on the land *a* of valve element 359 and modulator pressure line 248 acting on the land *c* of control valve element 362 provides a force in the upshift direction against the downshift direction force of the spring 364. When governor and modulator pressure overcome the spring force, the valve elements upshift. In upshift position land *a* of valve element 359 blocks exhaust 372, main line 117 is connected to the three-four shift signal line 371 and the main line pressure between lands *a* and *b* provides a primary additional upshift hysteresis force. In addition, modulator pressure also acts on land *b* of control valve element 362 to provide an additional upshift force causing downshifts at lower speeds. The exhaust 374 vents the valve bore between the downshift line 375 and main line 117. Hold or detent pressure in three-four downshift line 375 and its branch 376 is connected between the valve elements when in the downshift and upshift position respectively to position valve element 359 in a downshift position at proper speeds. When detent pressure is supplied to line 174 the three-four shuttle valve 377 connects it to four-three downshift line 375 unless the selector valve is in drive one, two or three position and supplies the higher hold pressure to drive three line 201 which is then connected to downshift line 375 and detent pressure is blocked. This shuttle valve 377 has the same structure and operation as shuttle valve 332 so the parts have the same reference numerals double primed.

ONE-TWO RELAY VALVE

The one-two relay valve 378, FIG. 3, has a valve element 379 having equal diameter lands *a*, *b* and *c* located in a bore 381 and is biased to the first speed position shown by a spring 382 seated on the spring seat 383 located in a closed chamber 384. The chamber 384 is connected by a port 386 and a passage 387 through the valve element to a port 388 located in a groove 389 in the land a to exhaust the chamber in the upshift position. Main line pressure supplied from the selector valve 191 to the drive four line 203 is always connected through restriction 391 in the priority valve 392 to the priority main line 393. The priority valve has arranged in parallel with restriction 391 a relief valve having a valve element 394, closing port 395 under the bias of spring 396 in vented chamber 397 when the pressure in main line and drive four line 203 is insufficient for properly operating the transmission and open when the pressure is sufficient. The valve will close momentarily during shifts involving engagement of second, third and fourth in forward drives to maintain sufficient main line feed pressure to the modulator valve 253 and governor valve 223. The restriction 391 provides an exhaust connection in neutral position of the selector valve.

Relay valve 378 in the first speed position shown, connects the one-two shift lines 398 to exhaust line 306, blocks priority drive four line 393, connects the main line 117 via restriction 399 to the line 307, blocks restricted branch 402 of exhaust line 306 and connects reverse drive lines 195 from the manual selector valve adjacent land c to the spring chamber 384 which is closed since passage 387 is blocked. When the one-two shift signal valve 316 provides pressure in the one-two signal line 322 to supply fluid to the closed chamber 401, valve element 379 is moved against the bias of the spring except in reverse to the second speed position. Then spring chamber 384 is connected via passage 387 to exhaust line 306, priority drive four line is connected to the one-two shift line 398, main line 117 is blocked by land *b*, the line 307 is connected via restricted branch 402 to exhaust line 306 and reverse line 195 is blocked by land *c*.

TWO-THREE RELAY VALVE

The two-three relay valve 406 has a valve element 407 having equal diameter lands *a*, *b* and *c* located in a bore 408 and biased by a spring 409 to the downshift or second speed position shown in FIG. 3. The spring is seated on a seat and pin assembly 411 in a chamber 412 vented by exhaust 414. When the relay valve is biased by the spring to the second speed position, the two-three shift feed line 415 is connected between lands *a* and *b* via branch 416 to exhaust line 306, one-two shift line 398 has unrestricted branch 417 blocked by land *b* and the restricted branch 418 connected between lands *b* and *c* to the second brake line 419 and restrictive branch 421 of the exhaust line 306 is blocked by land *c*. When the two-three shift signal valve 341 supplies the two-three shift signal line 354 pressure to chamber 422, the two-three relay valve element moves against the spring 409 to the stop pin and exhaust branch 416 is blocked by land *a*. The one-two shift signal line 398 via branch 417 is connected to the two-three shift line 415, the restricted branch 418 is blocked by land *b* and the second brake line 419 is connected via restricted branch 421 to exhaust line 306.

THREE-FOUR RELAY VALVE

The three-four relay valve 424 has a valve element 425 having equal diameter lands *a*, *b* and *c* located in a bore 426 and is biased by a spring 427 to the third position shown in FIG. 4. The spring is located in the chamber 428 vented by exhaust 429 and seated on a seat and valve stop assembly 431. When the valve element 425 is biased to the third position shown by the spring 427, reverse drive line 195 is connected between the lands *a* and *b* to the fourth clutch lines 432, the two-three shift signal line 415 has restricted branch 434 blocked by the land *b* and restricted brance 435 connected between lands *b* and *c* to the third brake line 436 and the exhaust line 306 connected by restriction 437 is blocked by land *c*. When the three-four shift signal valve 358 provides a signal pressure in the three-four shift signal line 371 to the chamber 438, this pressure acts on land a moving to valve to the fourth speed position. Then reverse drive line 195 is blocked by land *a*, two-three shift line 415 is connected by restrictive branch 434 to the fourth clutch line 432 and branch 435 is blocked by land *b* and the third brake line 436 is connected via restriction 437 to exhaust line 306.

TRIMMER REGULATOR VALVE

The trimmer regulator valve 441, FIG. 3, has a valve element 442 having equal diameter lands *a*, *b*, *c* and larger land *d* located in a stepped bore 443 and is biased to the feed position shown by a spring 444 seated on an abutment and stop pin assembly 446 located in a spring chamber 447 vented by exhaust 488. With the valve element 442 in the feed position shown, main line 117 branch 451 is connected between the lands *b* and *c* to the trimmer regulated pressure line 452 which is connected by branch 453 which may be restricted to the closed chamber 454 to act on the end of land *a* and oppose the spring bias and regulate the pressure. When the trimmer regulated pressure exceeds the regulated value, it will move the valve element 442 to the left connecting trimmer regulator pressure line 452 between lands *a* and *b* to exhaust 456. The modulator pressure line 248 is connected between the lands *c* and *d* to act on the unbalanced area of land *d* opposing the spring. Increasing inverted modulator pressure or decreasing torque demand provides reduced trimmer regulator pressure.

TRIMMER VALVES

The first and reverse drive trimmer valve 461 has a trimmer regulator element 462 having a small land a and large land b located respectively in small bore 463 and large bore 464. The first brake apply line 309 is connected to the end of the bore 463 and acts on land a to bias the valve to the right to the open position connecting first brake apply line 309 to exhaust 467 to reduce the pressure. First brake apply pressure from line 309 is also continuously connected through restriction 468 to the space 469 between the regulating valve element 462 and an actuator plug 471 which is shown seated on a stop member 472 fully compressing the spring 473 located in a closed chamber 474 having trimmer regulator pressure connected thereto at a port 475 below the stop and thus never blocked by plug 471. When line 309 is vented, spring 473 is extended with plug 471 engaging regulator valve element 462. On the initial supply of fluid to the first brake by first brake apply line 309, pressure acts on regulator valve element 462 and is regulated at a low pressure value determined by the trimmer regulator pressure which includes with increasing torque demand and the minimum spring force at full height in the valve assembly. At the same time fluid slowly flows through restriction 468 to fill and enlarge the space 469 to gradually separate the regulator valve element and plug so that the spring 474 is more and more compressed to gradually increase the regulated pressure at a rate determined by the restriction and spring rate until the maximum regulated pressure is provided with the valve elements in the position shown for gradual engagement of the friction devices. Then the pressure quickly increases to main line pressure. The valve will remain in this position until the first brake apply line 309 is exhausted and the valve will return to the initial position. The use of trimmer regulator pressure makes it possible to individually set the low pressure and rate of pressure rise to meet the requirements of each friction device with the same valve structure and springs fitting therein.

The second speed trimmer valve 476 similarly has a regulator valve element 477 having small land a and large land b respectively located in small bore 478 and large bore 479. Second brake pressure in line 419 is connected by branch 481 to the end of bore 478 and acts on the land a to move the regulator valve 477 and the plug 482 against bias of spring 483 and trimmer regulator pressure from line 452 and port 489 in chamber 487 to connect line 481 to exhaust 488 to reduce the pressure. The stop element 484 limits movement of the plug 482 and compression of the spring 483. When pressure is supplied to the second brake line 419 trimmer valve 476 gradually increases the pressure like first and reverse drive trimmer valve 461.

The third speed trimmer valve 496 has the same construction and function. Primed numbers from the second speed have been used to indicate like parts. This valve similarly controls the third brake apply line 436 pressure, which is connected by branch 497. The fourth clutch trimmer valve 501 is similar to the above trimmer valves and functions in the same way and thus the same reference numerals with double primes have been used. The fourth clutch trimmer valve 501 similarly regulates the fourth clutch pressure in line 432.

OPERATION

When the engine driving this transmission is running, the transmission input driven pump 112, FIG. 6, supplies fluid under pressure to the main line 117 which is regulated at a normal line pressure value, i.e., 150 psi when the transmission is in forward drive and forward drive knockdown pressure is supplied via line 135 to the regulator valve and at a higher reverse drive pressure, i.e., 250 psi in reverse drive when this knowndown pressure is not supplied. The regulator valve exhaust line 136 is connected through coupling feed line 146 and coupling bypass valve 150 to the lubrication line 138 which lubricates the transmission gearing.

In neutral position, the manual selector valve 191 supplies fluid to the forward knockdown line 135 and the signal feed line 194 and the other lines, reverse 195, low 197, first 198, second 199, third 201 and fourth 203 drive lines are connected to exhaust. The trimmer regulator valve 441 supplies trimmer regulator pressure to line 452, the modulator pressure regulator valve 241 provides modulator pressure in line 248 inversely proportional to engine load and torque demand and the transmission output governor valve 223 will provide a governor signal in line 236 that is a function of output speed. The hold pressure regulator valve is not supplied and thus there is no hold pressure in line 217 and there is no detent pressure in line 174.

Normally when the selector valve is in neutral position to output or vehicle driven thereby will be stationary or nearly so and the engine is running to pressurize the system as pointed out above, the governor pressure and modulator pressure will be insufficient to overcome the downshift bias of the springs so the one-two, two-three and three-four shift signal valves 316, 341 and 358 will be in the downshift position connecting the first speed apply one-two, two-three and three-four shift signal lines 322, 354 and 371 to exhausts 323, 353 and 372 respectively. The main line 117 is directly connected to each shift signal valve and blocked by land b thereof. Since there are no shift signal pressures the one-two, two-three and three-four relay valves 378, 406 and 424 are spring biased to the downshift or lower speed position. Since there is no pressure in low line 197, the LOW-1 shift signal valve 286, even in open position, cannot supply low shift signal line 292 and the LOW-1 relay valve 298 is spring biased to the first position so low first feed line 307 feeds first apply line 309. Thus, only first brake 89 is engaged providing a positive neutral.

If the output or vehicle is coasting at higher speeds, with the selector valve 191 inadvertently in neutral and the engine running the automatic output governor and modulator pressure control system will function as during automatic shifting described below to position the shift signal valves and relay valves in accordance wiht speed and torque demand. When the one-two relay valve 378 upshifts, first brake apply line 309 is connected by the low-1 relay valve 298 to the line 307 which is connected by the one-two relay valve 378 to exhaust 402 to disengage the first brake 89. Since drive four line 203 is exhausted at the selector valve in neutral position, the second and third brakes and fourth clutch cannot be applied. Thus on movement of the selector valve to a drive position, the forward clutch will be first engaged and then priority valve 392 will supply fluid to then engage the drive speed selected by the automatic controls. The drive and coasting shift engagement sequence is the same, the drive always being completed by the first, second, third or fourth speed engagement device.

On shifting the manual selector valve 191 to the drive four position, DR4, at the output speeds and engine load values insufficient to upshift the one-two shift signal valve 316, the main line 117 is connected by the one-two relay valve, line 307, the LOW-1 relay valve 298 and line 309 to engage the first brake 89 and drive four line 203 to engage forward clutch 51 for first ratio drive. The drive four line also supplies fluid to the priority valve 392 which feeds the drive four priority line 393 which in the first speed position of the one-two relay valve 378 is blocked by land b.

The other drive establishing devices are exhausted to disestablish the other drives. The second speed brake apply line 419 is connected by the downshifted two-three relay valve 406 to one-two shift feed line 398 which is connected by downshifted one-two relay valve 378 to the exhaust line 306 for disestablishing the second speed brake 82. The third speed brake apply line 436 is connected by the downshifted three-four relay valve 424 to the restricted branch 435 and two-three shift feed line 415 which is connected by the downshifted two-three relay valve to the exhaust branch 416 and line 306 to disengage third brake 76. The fourth speed clutch apply line 432 is connected via the downshifted three-four relay valve 424 to the reverse line 195 which is connected to exhaust at the selector valve 191 to disengage the fourth clutch 63. The lockup clutch 23 is exhausted via the lockup valve 271.

When the speed of the vehicle has increased sufficiently, the governor pressure in line 236 will cause the lockup valve 271 to upshift. When this occurs, the lockup apply line 281 will be connected to main line 117, thereby pressurizing the lockup clutch 23.

When the speed of the vehicle increases, so that governor pressure in line 236 upshifts the one-two shift signal valve 316 against the spring bias reduced by modulator pressure from line 248, the exhaust 323 is closed and the main line 117 supplies pressure to the one-two shift signal line 322 which acts in chamber 401 to upshift the one-two relay valve 378 from the downshifted position against the spring bias to the upshifted position. Upshifted one-two relay valve 378 connects the low-one shift line 307 which has engaged first speed via the low-one shift valve 298 to the exhaust line 306 to disengage first speed and connects the priority main line 393 to the one-two shift feed line 398 which is connected by the restricted branch 418 of the downshifted two-three relay valve 406 to the second brake apply line 419 for engagement of the second speed.

At a higher speed, governor pressure similarly upshifts the two-three shift signal valve 341 which will disconnect the second-third shift signal line 354 from exhaust 353 and connect it to main line. The second-third shift signal line 354 is connected to chamber 422 of the two-three relay valve 406 to upshift this valve to the upshift position connecting the second brake apply line 419 by restricted exhaust 421 to the low pressure exhaust line 306 and connects the unrestricted branch 417 of the one-two shift line 398 to the second-third shift feed line 415 which is connected via restricted branch 435 and downshifted three-four relay valve 424 to the third brake apply line 436 to engage third speed drive.

At a still higher speed the governor pressure will upshift the three-four shift signal valve 358 to disconnect the three-four shift signal line 371 from exhaust 372 and connect it to main line 117 to supply pressure to the chamber 438 to upshift the three-four relay valve 424. This upshifted relay valve will then connect third brake apply line 436 to restricted exhaust 437 and the low pressure exhaust line 306 and connect the two-three shift feed line 415 via restriction 434 to the fourth clutch apply line 432 to engage fourth speed drive.

Since the drive four line via the priority valve 392 and priority drive four line 393 sequentially feeds the one-two, two-three and three-four relay valves only one of the first, second, third and fourth speeds can be engaged and failure of any shift relay valve to upshift will prevent engagement of all higher speed drives. Since the shift signal valves upshift sequentially with increasing speeds, the drives will be changed in this sequence.

A reduction of governor pressure and/or modulator pressure will effect a downshift of the shift signal valves sequentially, the three-four shift signal valve, the two-three shift signal valve and then the one-two shift signal valve to provide the reverse of the above described upshifting operation and thus provide downshifting in this sequence.

When the throttle pedal is in the through detent position which may be either just prior to, at, or just beyond full throttle position, through detent valve 162 supplies to the detent line 174 fluid at a regulated pressure to each of the four-three shuttle valve 377 three-two shuttle valves 357 and two-one shuttle valve 332. If the hold feed pressure supplied by line 204 in the manual valve via the drive three line 201, drive two line 199 and drive one line 198 respectively is present in any of these valves the detent pressure being lower will be ineffective and remain blocked. However, if the hold feed pressure is not present in any of these valves, the detent pressure will, as explained above, move the ball 333 from the detent line 335 to the hold feed pressure seat 336 and the detent pressure will be connected to the downshift line connected to that shuttle valve. As pointed out above, the four-three downshift line 375, the three-two downshift line 355 and the two-one downshift line 329 are respectively connected to the three-four shift signal valve 358, the two-three shift signal valve 341 and the one-two shift signal valve 316 and will provide up and downshifts of each of these shift valves at a higher speed than the normal shift speeds and remove the normal downshift bias by the spring modified by modulator pressure.

Movement of the manual selector valve 191 to the drive three position, DR3, in addition to supplying the signal feed line 194, forward knockdown line 135 and drive four line 203 as in drive four position also feeds the hold feed line 204 and blocks the exhaust of the drive three feed line 201. Thus the hold pressure, regulated by the hold regulator valve 209, is supplied to the drive three line 201 which is connected by four-three shuttle valve 377 regardless of the presence or absence of detent pressure to the four-three downshift line 375 which will downshift the three-four shift signal valve at a higher speed than detent pressure. The shift valves control the relay valves for shifting the transmission as in automatic drive but up and downshifts from third to fourth speed occur at a higher speed. Thus normal power driving would be limited to first to third speeds but coast upshifts to fourth are permitted.

Movement of the manual selector valve 191 to the drive two position, DR2, will additionally interconnect the drive three line 201 to supply hold pressure to the drive two line 199 which will be connected by the three-two shuttle valve 357 to the three-two downshift line 355 which similarly acts on the two-three shift signal valve 341 to control the two-three relay valve 406 for shifting the transmission at a higher speed than detent shifting, so normal power one-two shifts are provided with coast upshifts to third and fourth.

Movement of the manual selector valve 191 to the drive one position, DR1, additionally connects hold pressure from drive three feed line 201 to the drive one line 198 which is connected by the two-one shuttle valve 332 to the two-one downshift signal line 329 which acts on the one-two shift signal valve 316 to control the one-two relay valve 378 to shift the transmission between first and second speeds at higher speeds than the detent downshift to normally hold first speed but permit coast upshifts.

Movement of the manual selector valve to low drive position LOW additionally connects hold pressure to the low drive line 197 which, as explained above, at low throttle and low speed is connected by low one signal valve 286, when in open or shifting position shown, to low signal line 292 to position low one relay valve 298 in low position to connect the low first feed line 307 to low brake line 294 to establish low drive. Thus the one-two shift signal valve 316 with hold pressure applied thereto must be downshifted so that one-two relay valve 378 is downshifted to supply the low first feed line 307 before a first to low shift can be made. Thus, if the one-two relay valve is downshifted, the selector valve is in low drive position, inverted modulator pressure indicates a low torque demand and/or power, i.e., less than 15 percent throttle advance, and also a low speed, i.e., 8 mph, the low one signal valve 286 will provide hold pressure in low one signal line 292 downshifting low one relay valve 298 for low drive.

In order to make a shift to reverse the selector valve must be first moved to neutral, placing the control system in the above described neutral condition, and then to reverse R. In the reverse position R the selector valve 191 exhausts the drive four line 203 and forward knockdown line 135 through the hold feed line 204, the hold regulator valve 209 and drive three line 201 to exhaust 202. Exhausting the forward knockdown line 135 causes main pressure regulator valve 119 to increase main line pressure in line 117 to a higher value, i.e., 250 psi. The forward clutch 51, the second brake 82 and the third brake 76 are exhausted. It also exhausts the normal forward drive feed through the priority valve and relay valves, which through the two-three shift line 415 with the three-four relay valve 424 upshifted feeds the fourth clutch apply line 432 or when downshifted the third brake apply line 436. To establish reverse drive three-four relay valve must be in the downshifted or third speed position. Then the selector valve 191 in reverse position connects main line 117 to reverse line 195, which with the three-four relay valve 424 in the downshift position is connected to the fourth clutch apply line 432 to engage the fourth clutch. In addition, to establish reverse, the first brake 89 must be applied. Main line 117 is connected by one-two relay valve 378 to supply low first feed line 307 which is connected by the low-one relay valve 298 to first apply line 309. Of course, if the 1–2 relay valve 378 is upshifted at this time, line 307 will be exhausted through line 306 so reverse drive cannot be engaged when the vehicle is moving forward in the second or higher gear ratio.

In the above description, reference to a direction of the valve on the drawing as right or left is merely for convenience and it will be appreciated that the location and relative arrangement of the valves is not important but that they may perform the above described functions in any position.

It will be appreciated that the invention may be used in the above described preferred embodiment and modifications thereof.

It is claimed:

1. A transmission and control comprising; an input; an output; multiratio gearing drive connected between said input and output having selectively operable low and first ratio drive engaging devices for selectively establishing low and first ratio drives; a source of fluid under pressure; governor means providing a governor signal varying as a function of output speed; modulator means providing a signal varying as a function of torque demand; shift control means connected to said source and said low and first devices operative in a first position to control the supply of fluid to establish first ratio drive and in low position to control the supply of fluid to establish low ratio drive; manual shift control means operatively connected to said shift control means operative in a first position to position said shift control means in said first position and operative in a low drive position to provide a low drive signal; low shift signal means connected to said manual shift control means and said shift control means operative in response to said low shift signal in a shifting position and to position said shift control means in said low position and operative in an inhibiting position to position said shift control means in said first position and in the absence of said low shift signal in both said shifting and inhibiting positions to position said shift control means in said first position, said low shift signal means having operating means independently responsive to both said torque demand signal below a predetermined low torque demand value and to said governor signal at speeds below a predetermined speed to position said low shift signal means in said shifting position and responsive to either said torque demand signal above said predetermined torque demand or said speed signal above said predetermined speed to position said low shift signal means in said inhibiting position.

2. The invention defined in claim 1 and means connected to said low device and said low shift signal means responsive to the establishment of said low device to position said low shift signal means in said shifting position.

3. The invention defined in claim 1 and said low shift signal means having actuating means for independently adjusting said predetermined torque demand and said predetermined speed.

4. The invention defined in claim 3 and actuating means having one adjustable spring opposing said torque demand signal and another adjustable spring opposing said speed signal.

5. A transmission and control comprising: an input; an output; multiratio gearing drive connected between said input and output having selectively operable low and first ratio drive engaging devices for selectively establishing low and first ratio drives; a source of fluid under pressure; governor means providing a governor signal varying as a function of output speed; modulator means providing a signal varying as a function of torque demand; shift control means connected to said source and said low and first devices operative in a first position to control the supply of fluid to establish first ratio drive and in low position to control the supply of fluid to establish low ratio drive; manual shift control means operatively connected to said shift control means operative in a first position to position said shift control means in said first position and operative in a low drive position to provide a low drive signal; low shift signal means connected to said manual shift control means and said shift control means operative in response to said low shift signal in a shifting position and to position said shift control means in said low position and operative in an inhibiting position to position said shift control means in said first position and in the absence of said low shift signal in both said shifting and inhibiting positions to position said shift control means in said first position, said low shift signal means having operating means independently responsive to both said torque demand signal below a predetermined low torque demand value and to said governor signal at speeds below a predetermined speed to position said low shift signal means in said shifting position and responsive to either said torque demand signal above said predetermined torque demand or said speed signal above said predetermined speed to position said low shift signal means in said inhibiting position and independently adjustable to independently adjust said predetermined torque demand and said predetermined speed; means connected to said low device and low shift signal means responsive to the establishment of said low device to position said low shift signal means in said shifting position.

6. A transmission and control comprising; an input; an output; gear means drive connected between said input and output having selectively engageable low and first ratio drive engaging devices for establishing respectively low and first ratio drives; a source of fluid under pressure; speed governor means connected to said output and said source providing a governor pressure varying with output speed; modulator means providing a modulator pressure varying with torque demand; selector valve means connected to said source and having a low drive line operative to connect said source in a low drive position to said low drive feed line; low first relay valve means connected to said source and said first drive means and having a low apply line connected to said low drive device, biasing means normally biasing said relay valve means to a first position connecting said source to said first drive device for establishing first drive and low signal means operated by pressure to move said relay valve means to a low position connecting said source to said low apply line and low drive device for establishing low drive and low shift signal valve means connected to said low drive line, said speed governor means, said modulator means, and said low signal means and having a valve element and a control element movably between open and closed positions in a bore having stop means preventing movement of said control element beyond said positions, said valve element in closed position blocking said low drive line and exhausting said low signal means and in open position connecting said low drive line to supply pressure from said low drive line to said low signal means, a low force spring biasing the valve element toward said open position and said control element, a high force spring biasing said control element torward said valve element and providing an excess differential biasing force engaging and moving both elements to closed position, said control element having an unbalanced area acted on by said modulator pressure operative at and above a predetermined low torque demand value in conjunction with said excess differential force to move said engaged elements to closed position and below said predetermined torque demand value in conjunction with said excess differential force to move said engaged elements to said open position, said governor pressure being connected to control said valve element in all positions and operative at speeds above a predetermined low speed to move said valve element from open to closed position in conjunction with said low force spring independent of torque demand and at speeds below said predetermined speed not affecting control by said torque demand pressure signal at said predetermined torque demand.

7. The invention defined in claim 6 and means to adjust the force of said high force spring to independently adjust said predetermined torque demand, and means to adjust the force of said low force spring to independently adjust said predetermined speed.

8. The invention defined in claim 6 and said low shift signal valve means having means responsive to low apply pressure to hold said low shift signal means in open position.

9. A transmission and control comprising: an input; an output; gear means drive connected between said input and output having selectively engageable low and first ratio drive engaging devices for establishing respectively low and first ratio drives; a source of fluid under pressure; speed governor means connected to said output and said source providing a governor pressure signal incresing with increasing output speed; inverted modulator means providing an inverted modulator pressure signal decreasing with increasing torque demand; selector valve means connected to said source and having a low drive line operative to connect said source in a low drive position to said low drive feed line; low first relay valve means connected to said source and said first drive device and having a low apply line connected to said low drive device, biasing means normally biasing said relay valve means to a first position connecting said source to said first drive device for establishing first drive and low signal means operated by pressure to move said relay valve means to a low position connecting said source to said low apply line and low drive device for establishing low drive and low shift signal valve means connected to said low drive line, said low apply line, said speed governor means, said modulator means, and said low signal means and having a valve element and a control element movably between open and closed positions in a bore having stop means preventing movement of said control element beyond said positions, said valve element in closed position blocking said low drive line and exhausting said low signal means and in open position connecting said low drive line to supply pressure from said low drive line to said low signal means, a low force spring biasing the valve element toward said open position and said control element, a high force spring biasing said control element toward said valve element and providing an excess differential biasing force engaging and moving both elements to closed position, said control element having an unbalanced area acted on by said inverted modulator pressure signal operative at and below a predetermined pressure at and above a predetermined low torque demand value permitting said excess differential force to move said engaged elements to closed position and on increase of said modulator pressure signal below said predetermined torque demand value overcoming said excess differential force to move said engaged elements to said open position, said governor pressure signal being connected to said bore between said elements in all positions and operative at speeds above a predetermined low speed to exert a force on said valve element to move it from open to closed position against said low force spring independent of torque demand and at speeds below said predetermined speed not affecting control by said torque demand pressure signal at said predetermined torque demand.

10. The invention defined in claim 9 and means to adjust the force of said high force spring to independently adjust said predetermined torque demand, and means to adjust the force of said low force spring to independently adjust said predetermined speed.

11. The invention defined in claim 9 and said low shift signal valve means having means responsive to low apply pressure to hold said low shift signal means in open position.

12. A transmission and control comprising: an input; an output; gear means drive connected between said input and output having selectively engageable low and first ratio drive engaging devices for establishing respectively low and first ratio drives; a source of fluid under pressure; speed governor means connected to said output and said source providing a governor pressure signal increasing with increasing output speed; inverted modulator means providing an inverted modulator pressure signal decreasing with increasing torque demand; manually controlled valve means connected to said source and having a low drive line and a forward drive feed line and operative to connect said source in forward position to said forward feed line and in a low drive position to said forward and low drive feed lines; low first relay valve means connected to said low first feed line and said first drive device and having a low apply line connected to said low drive device, biasing means normally biasing said relay valve means to a first position connecting said low first feed line to said first drive device for establishing first drive and low signal means operated by pressure to move said relay valve means to a low position connecting said low first drive feed line to said low apply line and low drive device for establishing low drive and low shift signal valve means connected to said low drive line, said low apply line, said speed governor means, said modulator means, and said low signal means and having a valve element and a control element movably between open and closed positions in a bore having stop means preventing movement of said control element beyond said positions, said valve element in closed position blocking said low drive line and exhausting said low signal means and in open position connecting said low drive line to supply pressure from said low drive line to said low signal means, a low force spring biasing the valve element toward said open position and said control element, a high force spring biasing said control element toward said valve element and providing an excess differential biasing force engaging and moving both elements to closed position, said control element having an unbalanced area acted on by said inverted modulator pressure signal operative at and below a predetermined pressure at and above a predetermined low torque demand value permitting said excess differential force to move said engaged elements to closed position and on increase of said modulator pressure signal below said predetermined torque demand value overcoming said excess differential force to move said engaged elements to said open position, said governor pressure signal being connected to said bore between said elements in all positions and operative at speeds above a predetermined low speed to exert a force on said valve element to move it from open to closed position against said low force spring independent of torque demand and at speeds below said predetermined speed not affecting control by said torque demand pressure signal at said predetermined torque demand.

13. The invention defined in claim 12 and means to adjust the force of said high force spring to independently adjust said predetermined torque demand, and means to adjust the force of said low force spring to independently adjust said predetermined speed.

14. A transmission and control comprising: an input; an output; multiratio planetary gear means drive connected between said input and output having drive devices including selectively engageable low, first and second ratio drive engaging devices for establishing respectively low, first and second ratio drives; a source of fluid under pressure; speed governor means connected to said output and said source providing a governor pressure signal increasing with increasing output speed; inverted modulator means providing an inverted modulator pressure signal decreasing with increasing torque demand; manual selector valve means connected to said source and having a low drive line and a forward drive feed line and operative to connect said source in a forward automatic position to said forward feed line and in a low drive position to said forward and low drive feed lines; first second automatic shift valve means connected to said second drive device, said speed governor means and said modulator means and having supply means supplied by said forward drive feed line and source and having a low first feed line and being upshifted and downshifted by said governor and modulator pressure signals and operative in a downshift position to connect said supply means to said low first feed line and in an upshift position to connect said supply means to said second drive device to engage second drive; low first relay valve means connected to said low first feed line and said first drive device and having a low apply line connected to said low drive device, low signal means operated by pressure to move said relay valve means from a first position connecting said low first feed line to said first drive device for establishing first drive to a low position connecting said low first drive feed line to said low apply line and low drive device for establishing low drive both only when said first second automatic shift valve means is in said downshift position and low shift signal valve means connected to said low drive line, said low apply line, said speed governor means, said modulator means, and said low signal means and having a valve element and a control element movably between open and closed positions in a bore having stop means preventing movement of said control element beyond said positions, said valve element in closed position blocking said low drive line and exhausting said low signal means and in open position connecting said low drive line to supply pressure from said low drive line to said low signal means, a low force spring biasing the valve element toward said open position and said control element, a high force spring biasing said control element toward said valve element and providing an excess differential biasing force engaging and moving both elements to closed position, said control element having an unbalanced area acted on by said inverted modulator pressure signal operative at and below a predetermined pressure at and above a predetermined low torque demand value permitting said excess differential force to move said engaged elements to closed position and on increase of said modulator pressure signal below said predetermined torque demand value overcoming said excess differential force to move said engaged elements to said open position, said governor pressure signal being connected to said bore between said elements in all positions and operative at speeds above a predetermined low speed to exert a force on said valve element to move it from open to closed position against said low force spring independent of torque demand and at speeds below said predetermined speed not affecting control by said torque demand pressure signal at said predetermined torque demand.

15. The invention defined in claim 14 and means to adjust the force of said high force spring to independently adjust said predetermined torque demand, and means to adjust the force of said low force spring to independently adjust said predetermined speed 16. A transmission and control comprising: an input; an output; multiratio planetary gear means drive connected between said input and output having a forward drive device, and selectively engageable low, first and second ratio drive engaging devices for establishing on engagement of said forward drive device respectively low, first and second ratio drives; a source of fluid under pressure; speed governor means connected to said output and said source providing a governor pressure signal increasing with increasing output speed; inverted modulator means providing an inverted modulator pressure signal decreasing with increasing torque demand; manual selector valve means connected to said source and having a low drive line and a forward drive feed line connected to said forward device and operative to connect said source in a forward automatic position to said forward feed line and in a low drive position to said forward and low drive feed lines; first second automatic shift valve means connected to said source, said forward drive feed line, said second drive device, said speed governor means and said modulator means and having a low first feed line and being upshifted and downshifted by said governor and modulator pressure signals and operative in a downshift position to connect said source of said low first feed line and in an upshift position to connect said forward drive feed line to said second drive device to engage second drive; low first relay valve means connected to said low first feed line and said first drive device and having a low apply line connected to said low drive device, biasing means normally biasing said relay valve means to a first position connecting said low first feed line to said first drive device for establishing first drive and low signal means operated by pressure to move said relay valve means to a low position connecting said low first drive feed line to said low apply line and low drive device for establishing low drive both only when said first second automatic shift valve means is in said downshift position and low shift signal valve means connected to said low drive line, said low apply line, said speed governor means, said modulator means, and said low signal means and having a valve element and a control element movably between open and closed positions in a bore having stop means preventing movement of said control element beyond said positions, said valve element is closed position blocking said low drive line and exhausting said low signal means and in open position connecting said low drive line to supply pressure from said low drive line to said low signal means, a low force spring biasing the valve element toward said open position and said control element, a high force spring biasing said control element toward asid valve element and providing an excess differential biasing force engaging and moving both elements to closed position, said control element having an unbalanced area acted on by said inverted modulator pressure signal in a direction opposite to said high force spring operative at and below a predetermined pressure at and above a predetermined low torque demand value permitting said excess differential force to move said engaged elements to closed position and on increase of said modulator pressure signal below said predetermined torque demand value overcoming said excess differential force to move said engaged elements to said open position, said governor pressure signal being connected to said bore between said elements in all positions and operative at speeds above a predetermined low speed to exert a force on said valve element to move it from open to close position against said low force spring independent of torque demand and at speeds below said predetermined speed not affecting control by said torque demand pressure signal at said predetermined torque demand, means to adjust the force of said high force spring to independently adjust said predetermined torque demand, means to adjust the force of said low force spring to independently adjust said predetermined speed and having blocking means responsive to low apply pressure to hold said low shift signal valve means in open position.

* * * * *

PO-1050
(5/69)

UNITED STATES PATENT OFFICE
CERTIFICATE OF CORRECTION

Patent No. 3,818,783      Dated June 25, 1974

Inventor(s) Allan S. Norris and James T. Craig

It is certified that error appears in the above-identified patent and that said Letters Patent are hereby corrected as shown below:

In the Specification: Column 1, line 41, "valves" should be -- values --; Column 12, line 30, "brance" should be -- branch --; Column 12, line 36, after "moving" "to" should be -- the --; Column 12, line 49, numeral "488" should be -- 448 --; Column 13, line 20, "includes" should be -- increases --; Column 14, line 26, "to" should be -- the --;

In the Claims: Claim 6, column 19, line 45, "means" should be -- devices --; Claim 9, column 20, line 33, "incresing" should be -- increasing --.

Signed and sealed this 31st day of December 1974.

(SEAL)
Attest:

McCOY M. GIBSON JR.      C. MARSHALL DANN
Attesting Officer      Commissioner of Patents